US010679140B2

(12) United States Patent
Gomez et al.

(10) Patent No.: US 10,679,140 B2
(45) Date of Patent: Jun. 9, 2020

(54) DYNAMICALLY MODIFYING A BOUNDARY OF A DEEP LEARNING NETWORK

(71) Applicant: Seagate Technology LLC, Cupertino, CA (US)

(72) Inventors: Kevin Arthur Gomez, Eden Prairie, MN (US); Frank Dropps, Maple Grove, MN (US); Ryan James Goss, Prior Lake, MN (US); Jon Trantham, Chanhassen, MN (US); Antoine Khoueir, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 854 days.

(21) Appl. No.: 14/506,972

(22) Filed: Oct. 6, 2014

(65) Prior Publication Data

US 2016/0098646 A1    Apr. 7, 2016

(51) Int. Cl.
*G06N 20/00* (2019.01)
*H04L 29/08* (2006.01)
*G06N 7/00* (2006.01)
*G06N 3/04* (2006.01)

(52) U.S. Cl.
CPC ........... *G06N 20/00* (2019.01); *G06N 3/0454* (2013.01); *G06N 7/005* (2013.01); *H04L 67/10* (2013.01); *H04L 67/141* (2013.01)

(58) Field of Classification Search
None
See application file for complete search history.

(56) References Cited

U.S. PATENT DOCUMENTS

| 719,731 | A | | 2/1903 | Boulard | |
|---|---|---|---|---|---|
| 6,049,738 | A | * | 4/2000 | Kayama | G05B 13/027 700/29 |
| 6,345,311 | B1 | * | 2/2002 | Breslau | G06F 8/76 718/100 |
| 6,487,534 | B1 | * | 11/2002 | Thelen | G10L 15/30 704/270 |
| 6,760,699 | B1 | * | 7/2004 | Weerackody | G10L 15/20 704/233 |
| 7,127,087 | B2 | * | 10/2006 | Huang | G06K 9/00228 382/118 |

(Continued)

OTHER PUBLICATIONS

Neves et al., "Neural Networks in B-ISDN Flow Control: ATM Traffic Prediction or Network Modeling?" IEEE Communications Magazine, pp. 50-56, Oct. 1995.*

(Continued)

*Primary Examiner* — Alexey Shmatov
*Assistant Examiner* — Casey R. Garner
(74) *Attorney, Agent, or Firm* — Mueting Raasch Group

(57) ABSTRACT

A connection between a user device and a network server is established. Via the connection, a deep learning network is formed for a processing task. A first portion of the deep learning network operates on the user device and a second portion of the deep learning network operates on the network server. Based on cooperation between the user device and the network server, a boundary between the first portion and the second portion of the deep learning network is dynamically modified based on a change in a performance indicator that could affect the processing task.

18 Claims, 8 Drawing Sheets

(56) References Cited

U.S. PATENT DOCUMENTS

| | | | | |
|---|---|---|---|---|
| 7,636,789 | B2* | 12/2009 | Li | H04L 67/1085 709/231 |
| 8,442,821 | B1* | 5/2013 | Vanhoucke | G10L 15/14 704/232 |
| 8,447,419 | B1* | 5/2013 | de Anda Fast | G06N 3/126 700/83 |
| 8,589,151 | B2 | 11/2013 | Burke et al. | |
| 8,589,156 | B2* | 11/2013 | Burke | G10L 15/32 704/231 |
| 8,908,598 | B1* | 12/2014 | Oroskar | H04W 68/02 370/328 |
| 2003/0236760 | A1* | 12/2003 | Nugent | G06N 3/063 706/26 |
| 2004/0133565 | A1* | 7/2004 | Hinshaw | G06F 17/30477 |
| 2006/0229896 | A1* | 10/2006 | Rosen | G06Q 10/10 705/321 |
| 2007/0030815 | A1* | 2/2007 | Beerends | H04W 24/00 370/252 |
| 2008/0159622 | A1* | 7/2008 | Agnihotri | G06K 9/00228 382/157 |
| 2009/0304011 | A1* | 12/2009 | Smith | G06F 3/0607 370/401 |
| 2011/0173346 | A1* | 7/2011 | Neben | G06Q 10/00 709/246 |
| 2012/0122503 | A1* | 5/2012 | Ma | H04W 16/10 455/501 |
| 2012/0162265 | A1* | 6/2012 | Heinrich | G06Q 10/06393 345/661 |
| 2012/0240185 | A1* | 9/2012 | Kapoor | H04L 63/1425 726/1 |
| 2012/0276893 | A1* | 11/2012 | Lerbour | H04W 24/02 455/422.1 |
| 2013/0231947 | A1* | 9/2013 | Shusterman | G06F 19/3418 705/2 |
| 2014/0089232 | A1* | 3/2014 | Buibas | G06N 3/049 706/11 |
| 2014/0157142 | A1* | 6/2014 | Heinrich | H04L 67/1095 715/744 |
| 2014/0206374 | A1* | 7/2014 | Luo | H04W 16/10 455/452.1 |
| 2014/0222793 | A1* | 8/2014 | Sadkin | G06F 17/3053 707/723 |
| 2015/0106310 | A1* | 4/2015 | Birdwell | G06N 3/02 706/20 |
| 2015/0278200 | A1* | 10/2015 | He | G06F 17/2785 704/2 |
| 2015/0294422 | A1* | 10/2015 | Carver | G06Q 40/08 705/4 |
| 2015/0363670 | A1* | 12/2015 | Sugishita | H04N 7/181 382/155 |
| 2016/0034712 | A1* | 2/2016 | Patton | H04W 4/21 726/28 |
| 2016/0098646 | A1* | 4/2016 | Gomez | G06N 3/0454 706/12 |

OTHER PUBLICATIONS

Herrin, et al., "An Implementation of Service Rebalancing," in Computer Science (eds. R. Baeza-Yates and U. Manber), Plenum Press, New York. 1992.*

Neves et al., "Neural Networks in B-ISDN Flow Control: ATM Traffic Prediction or Network Modeling?" IEEE Communications Magazine, Oct. 1995, pp. 50-56.*

Braun et al., "Performance Evaluation of Dynamic and Static Bandwidth Management Methods for ATM Networks," Technical Report TISL-10230-5, Telecommunications and Information Sciences Laboratory, University of Kansas, Dec. 1994.*

Herrin II, et al., "The Benefits of Service Rebalancing," in Proceedings, Third Workshop on Workstation Operating Systems, Key Biscayne, FL, USA, Apr. 23-24, 1992.*

Herrin II, et al., "An Implementation of Service Rebalancing," in Computer Science (eds. R. Baeza-Yates and U. Manber), Plenum Press, New York. 1992.*

* cited by examiner

DYNAMICALLY MODIFYING A BOUNDARY OF A DEEP LEARNING NETWORK

SUMMARY

The present disclosure is related to dynamically modifying a boundary of a deep learning network. In one embodiment, methods, systems, apparatuses, and computer-readable media facilitate establishing a connection between a user device and a network server. Via the connection, a deep learning network is formed for a processing task. A first portion of the deep learning network operates on the user device and a second portion of the deep learning network operates on the network server. Based on cooperation between the user device and the network server, a boundary between the first portion and the second portion of the deep learning network is dynamically modified based on a performance indicator affecting the processing task.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The drawings are not necessarily to scale.

DETAILED DESCRIPTION

Figure 1:
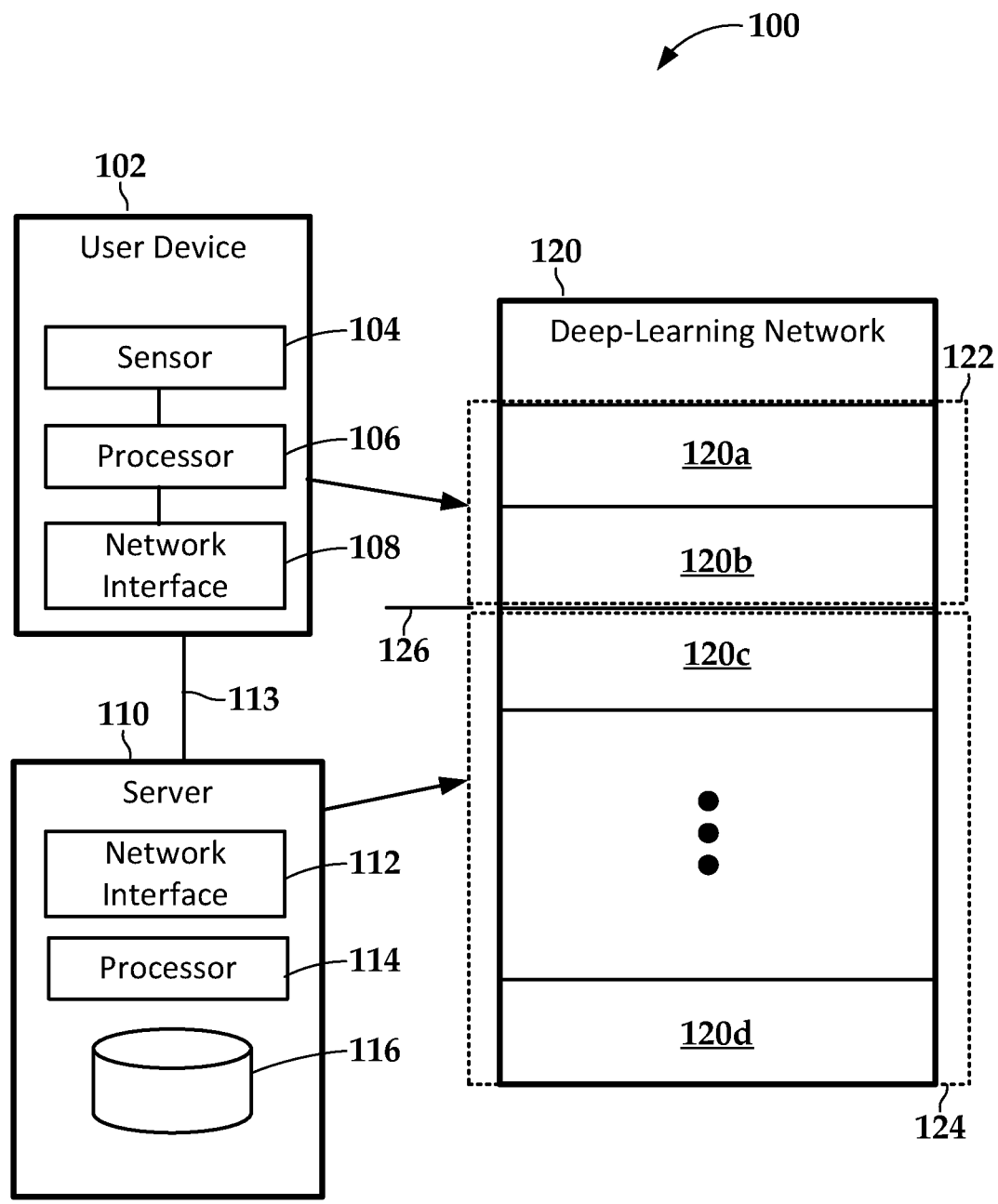
FIG. 1 is a block diagram of a system according to an example embodiment.

This disclosure generally relates to systems and apparatuses that facilitate distributing tasks between user devices (e.g., mobile devices) and network services. One class of computer tasks that have become widespread includes those that use sensors to detect patterns, and act on the detected patterns in a useful way on behalf of a user. Examples of these applications include optical character recognition (e.g., letters, barcodes), sound recognition (e.g., speech, music), image recognition (e.g., faces, fingerprints), motion pattern recognition (e.g., gait, speech, context), etc.

Applications such as speech recognition have become popular on mobile devices for providing, among other uses, an alternate means of user input. Instead of typing into a small keyboard, a command can be sent by speaking into the device. The sound is translated into words, which are then interpreted as phrases to assist in navigation, perform a web search, etc. The usefulness of speech recognition (and other pattern recognition applications) has helped further drive demand for mobile devices.

Mobile user devices are becoming ubiquitous, ranging in size and complexity from laptop computers to wearable devices. One reason for the ubiquity of mobile devices is convenience (e.g., they are small, light, and wireless) along with increasing capabilities included in such devices. Nonetheless, the small size of the devices may necessarily reduce the computational power compared to a larger device. This is due to reduction in size of power supplies (e.g., batteries) and other factors (e.g., ability to dissipate heat) that become more difficult to deal with as the size of the device decreases. The task of speech recognition can be computation-intensive for a mobile device, and so speech recognition applications may divide the speech recognition tasks between the user's mobile device and a network server.

Speech recognition tasks performed by a mobile device in such a case may at least include analog capture, filtering, and digital encoding/transforming of the analog signal. This transforms the analog signal to a relatively compact digital representation of the speech, which can be communicated to a server over the network. The server may perform more computationally intensive actions, such as inputting the encoded representation into a hidden Markov model (HMM) and/or neural network. The HMM and neural networks include algorithms and data structures that are trained on human speech, and can find patterns in digitally encoded speech.

An HMM is a statistical model that assumes a Markov process with hidden states. For speech recognition, the HMM analyzes segments of speech (e.g., frequency domain components of the segments) and to determine phonemes based on an acoustic model. A time-ordered series of phonemes are analyzed to form hypothesis of the spoken words, e.g., using an N-gram language model. Generally, an N-gram language model determines probability of a word conditioned on N−1 predecessors. Multiple possibilities for the word or word sequence are tracked until a most likely sequence is found.

A neural network uses interconnected computing elements (e.g., neuron-like elements implemented in software and/or circuits) that can adaptively weight the interconnections, e.g., during training and prediction. The weighted interconnections form a network that can predict whether a given pattern matches a learned pattern. The neural network can be generic, e.g., does not need to have domain-specific knowledge of the data being analyzed. However, for best results, the encoding of the data fed into the neural network may be tailored for a particular application domain, e.g., image recognition, speech recognition, etc.

Neural networks and HMMs may be part of deep learning and deep belief networks. Generally, a deep learning network uses multiple layers of processing, the layers including any combination of HMMs, neural networks, etc. A deep-belief network is a particular type of deep learning network, e.g., using multiple layers of stochastic, latent variables. Other types of deep learning networks include deep neural networks and convolutional deep neural networks. For purposes of the following discussion, systems that are described that implement deep learning networks. The deep learning networks may include any of these particular types of hierarchical machine-learning networks such as deep-belief networks, deep-neural networks, etc. For tasks such as speech recognition, a hierarchical approach may include additional features, such as an attention component that allows the device to follow/track a particular conversation in a noisy environment.

In FIG. 1, a block diagram shows a system 100 according to an example embodiment. The system 100 includes a user device 102, e.g., a mobile device. Generally, a mobile device may be capable of at least portable operation via a self-contained power supply and wireless communication ability. Example mobile devices may include, but are not limited to, mobile phones, tablets, digital cameras, navigation devices, wearables (e.g., glasses, watches), automotive electronics, laptop computers, etc. The user device 102 may include other devices, such as conventional personal computers, embedded devices (e.g., home appliances or electrical fixtures), consumer electronics devices (e.g., televisions, stereos), set top boxes, networking equipment, etc.

The user device 102 includes a processor 106, at least one sensor 104 coupled to the processor 106, and a network interface 108 coupled to the processor 106. The sensor 104 facilitates user interaction with the user device 102, and may also be used for other measurements (e.g., location). The sensor 104 may include switches, touch sensors (e.g., touchscreen, fingerprint reader), optical sensor (e.g., camera, infrared sensor, ultraviolet sensor, antenna), microphones, environmental sensors (e.g., temperature, pressure, humidity, orientation, geolocation, acceleration) switches, etc. The sensor 104 may be coupled to analog and digital processing circuitry as is known in the art. The processor 106 may include any combination of general-purpose or special-purpose logic circuitry, such as a central processing unit (CPU), field-programmable gate array (FPGA), digital signal processor (DSP), etc.

The network interface 108 provides the user device 102 with the ability to remotely communicate with other entities, such as a network server 110. Generally, the network interface 108 facilitates communication over a local network (not shown), e.g., via wires, optical media, and/or over-the-air transmissions. The local network can facilitate access to a wide-area network such as the Internet. For purposes of this example, the network interface 108 of the user device 102 communicates with a network interface 112 of the network server 110 via connection 113. The connection 113 may be established using local and remote networking protocols known in the art.

The server 110 also includes a processor 114 coupled to the network interface 112. The processor 114 may include multiple processors, and the server itself may be formed of multiple physical nodes, e.g., a cluster of locally networked computers that distribute tasks among one another. A data store 116 is also coupled to the processor, and may include different types of media (e.g., volatile and non-volatile random access memory, hard disk drives, solid state drives, etc.). The data store 116 may also include data structures such as logical volumes, filesystems, databases, etc., that facilitate operating system and application-level access to data.

The user device 102 and server 110 can establish a connection that facilitates forming a deep learning network 120 for a processing task. The processing task may include any task as described herein involving interpreting sensor inputs, such as pattern analysis and categorization. Generally, the deep learning network 120 is a predictive model that uses any number of layers 120*a-d*. Each of the layers 120*a-d* may process a different level of representation (e.g., layer of abstraction) of a particular problem. For example, for speech recognition, different layers may respectively process phonemes, words, phrases, sentences, linguistic meaning, context extraction, sentiment analysis, etc. The layers 120*a-d* facilitate returning conditional probabilities back to the user device 102, and/or returning a set of results based on the conditional probabilities, e.g., results determined and formatted by the server 110.

Both the user device 102 and server 110 are capable of operating overlapping portions of the deep learning network 120. This involves providing software components on the devices 102, 110 that are compatible with the respective devices 102, 110, and also able to communicate with each other via the connection 113. Using these software components and the network connection 113, a first portion 122 of the deep learning network operates on the user device 102 and a second portion 124 of the deep learning network operating on the network server 110.

A boundary 126 between the first and second portions 122, 124 of the network 120 may defined by enumerating which layers 120*a-d* of the deep-belief network 120 that are operating within the respective user device 102 and network server 110. Communications across the boundary 126 are facilitated by the network connection 113. Such network communication may include any combination of remote procedure calls, streaming data, stateless protocols, message passing protocols, etc. While other inter-layer communications interfaces may also utilize networking protocols, e.g., via a loopback address, the deep learning network boundary 126 is inter-device (between at least a user device and a server), and can be adjusted based on cooperation between the user device 102 and the server 110. In contrast, if the server 110 is implemented via distributed networked nodes (e.g., a cluster), those inter-node connections may not be considered a boundary in some cases, e.g., unless those server-to-server boundaries are dynamically modified for similar reasons and in a similar way as the user-device-to-server boundary.

Choice of the boundary 126 may depend on factors such as expected network performance, capability of the user device 102, and robustness of the deep learning network (e.g., ability to deal with data transmission errors and delays). Because the connection 113 may span multiple networks, the speed and latency of the connection 113 may be unpredictable. As a result, location of the boundary 126 may be shifted upward or downward based on network availability and performance. Other factors might also affect the location of the boundary 126, such as network access monetary cost (e.g., data roaming), user device battery life remaining, computing resources of the user device 102 and server 110, need for security, etc. For example, communications across the boundary 126 may be encrypted when used over public networks, but unencrypted over private networks.

In the illustrated example, the boundary 126 can be dynamically modified based on cooperation between the user device 102 and the network server 110. A change in boundary location will at least change the definition of the first portion 122 and the second portion 124 of the deep learning network 120. For example, where network performance is poor, the user device 102 may take on processing of more layers 120*a-d* of the deep learning network 120 if such a change results in reducing the amount of data that needs to be sent over the connection.

The modification of the boundary 126 may occur before the task occurs, while the processing task in progress, and/or after the processing task is complete (e.g., for the benefit of subsequent similar processing tasks). For example, if speech recognition of a short phrase is being processed, the boundary may not be modified until the processing of the short phrase is done, and thereafter subsequent phrases may be processed via a new boundary. However, if a longer-term or more performance sensitive task is progressing, e.g., interpreting a video stream, then it may be beneficial to pause the processing to utilize a modified boundary.

The modification of the boundary 126 may also involve making other changes to the interface between the user device 102 and server 110. For example, a resolution of encoded data and/or state values may be reduced or increased to facilitate the change, balancing prediction reliability versus speed. The modification of the boundary 126 is intended to improve perceived performance, e.g., perceived by a user of device 102. For example, perceived performance can be improved by sending predictions to the user device 102 early enough to offset latency of the communications network. This can be assisted by changing the boundary to adapt compute versus latency requirements.

Generally, the user device 102 may include all the layers of the deep learning network 120 in the range of boundary adjustability and only use particular layers when required, e.g., based on criteria of latency, power, accuracy, network availability/speed, etc. In this way, the adjusting process can be seamless and invisible to the user.

Other ways of improving perceived performance are through parallel processing using different boundaries. For example, if a spoken sentence is currently being processed by one definition of the boundary 126, this processing can continue on the existing boundary while the same sentence (or a subsequent sentence) is processed using a parallel process which uses a modified the boundary. If at least one of the parallel task sees improved performance, this may increase overall usability of the system.

Figure 6:
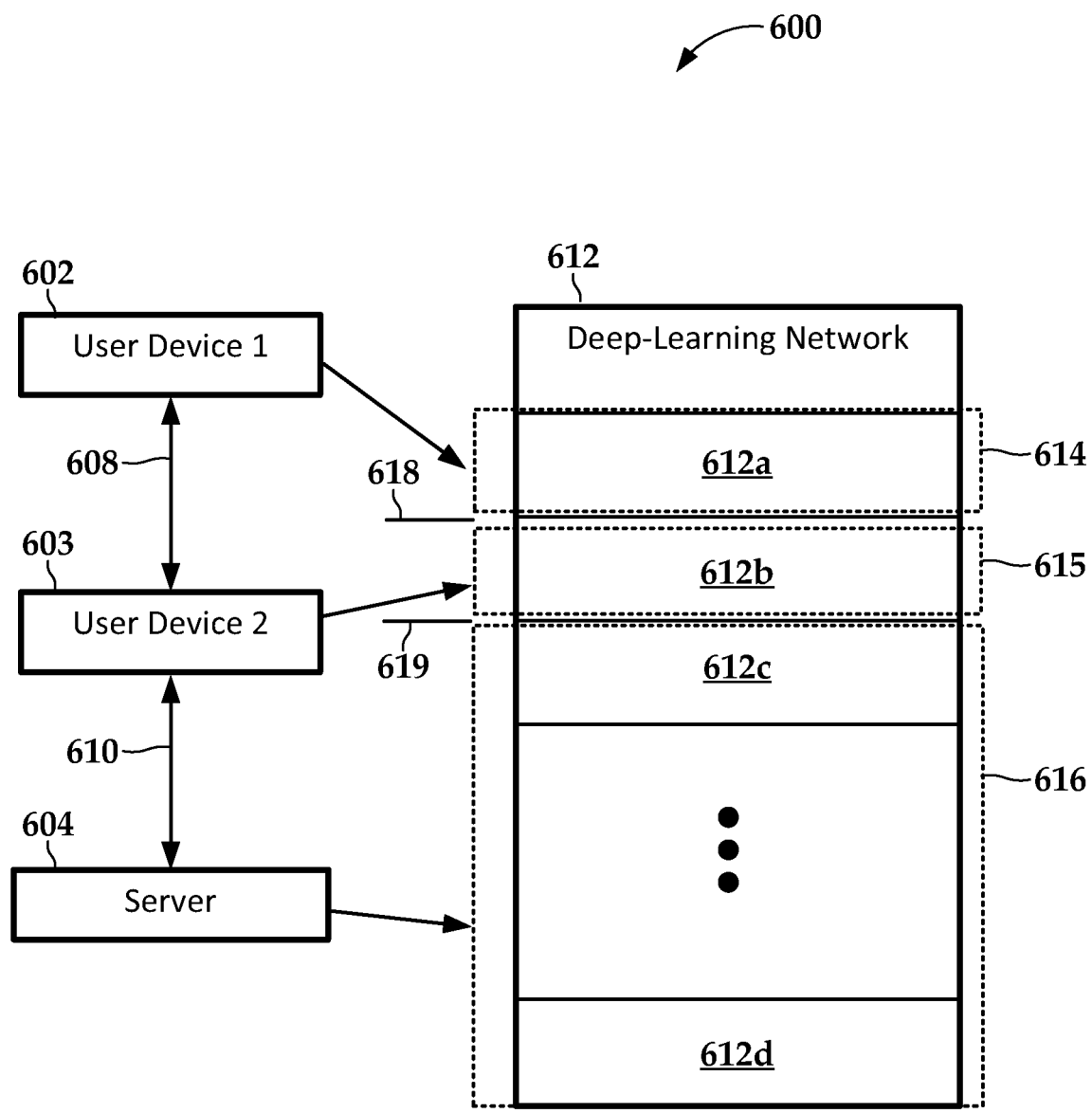
FIG. 6 is a block diagram of a system according to another example embodiment.

The example shown in FIG. 1 is a specific example of the more general case of the deep network which spans across a heterogeneous compute architecture. The heterogeneous compute architecture which may include multicore CPUs, GPUs, (graphics processing units) FPGAs (field-programmable gate arrays), reconfigurable logic and SPUs (storage processing units) connected by backplanes, Ethernet, silicon photonic, wireless networks, etc. Such general case may cover multiple boundaries (see, e.g., FIG. 6). An application can be dynamically mapped across boundaries of this architecture in a way that maximizes some cost function. The ability of to shift boundaries dynamically can be used to maximize the cost function in view of changing conditions outside the control of the devices.

Figure 2:
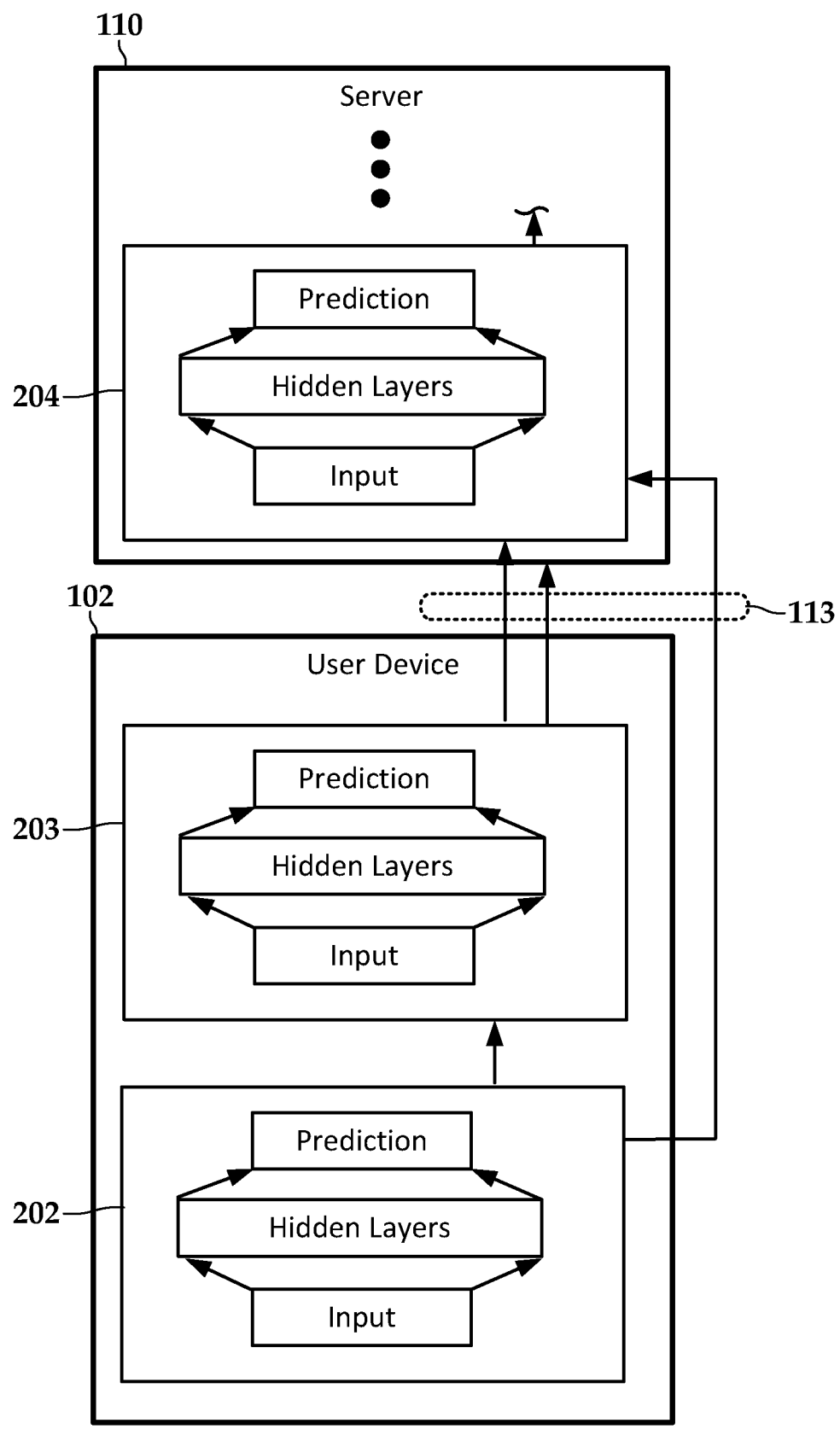
FIGS. 2 and 3 are block diagrams illustrate a shifting of a deep learning network boundary according to an example embodiment.
Figure 3:
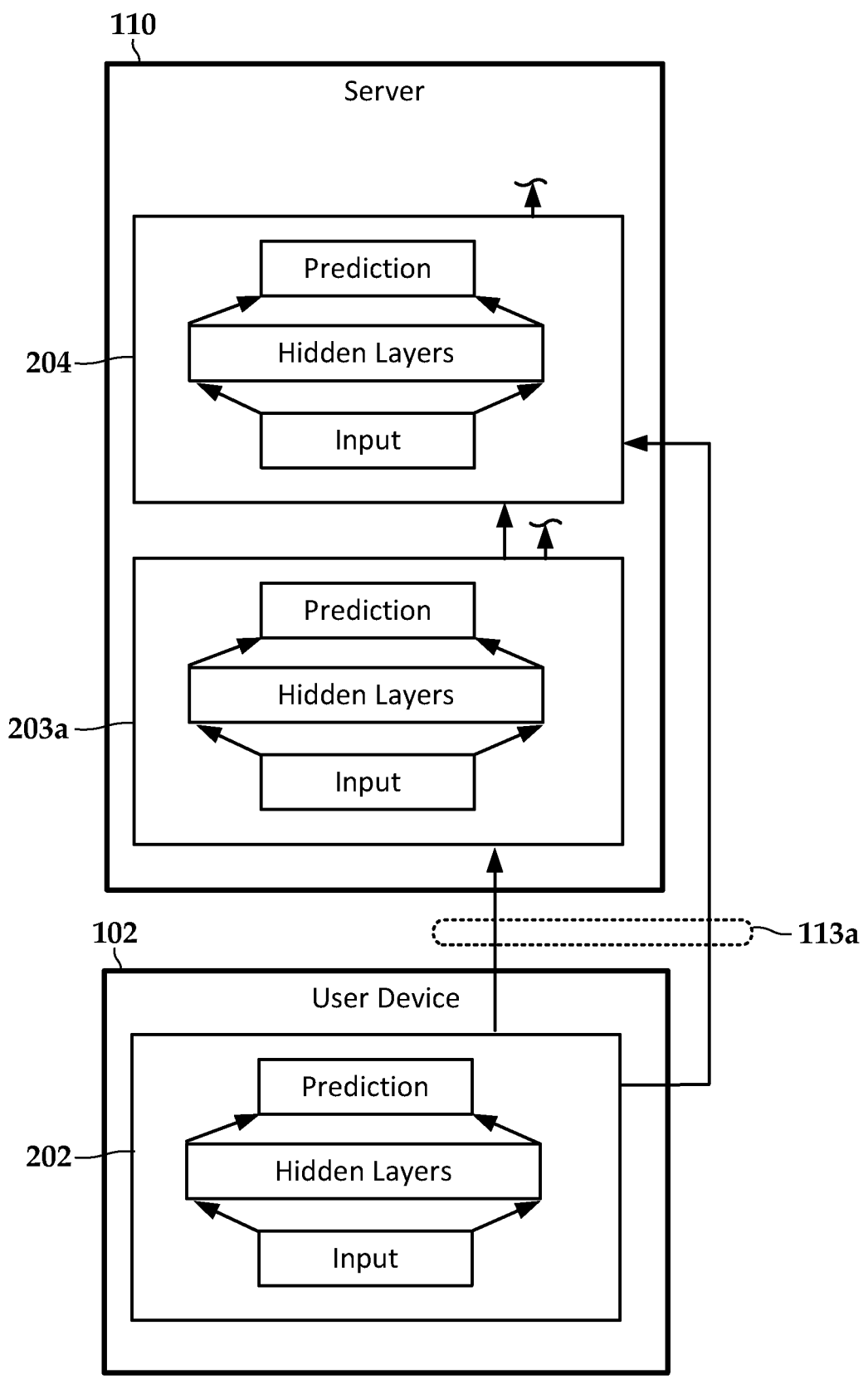

In FIGS. 2 and 3, block diagrams illustrate shifting of a deep learning network boundary according to an example embodiment. As seen in FIG. 2, at least part of a deep learning network includes modules 202-204 that are part of a deep stacking network. The modules 202-204 are neural networks that include a hidden non-linear layer and trainable weights. The inputs can include, e.g., spectral information from speech, pixel values for images, etc. The outputs of lower modules are fed as inputs to higher level modules. While only three modules 202-204 are shown, a deep stacking network can use many more such modules.

As seen in FIG. 2, modules 202 and 203 are executing on the user device 102, while module 204 is executing on the network server 110, along with any higher level modules (not shown). Communications between modules 202 and 203 are occurring within user device 102, while communications between modules 203 and 204 are occurring via network connection 113. The inter-device communication between modules 202 and 203 may also use network type communications, e.g., using a loopback Internet protocol (IP) address. In other cases, the modules 202, 203 may have multiple interfaces suitable for different types of communications, e.g., interprocess communications, shared memory, client-server networking, proximity networking, peer-to-peer networking, etc.

The higher levels of the network server 110 may be serving thousands of users simultaneously. For each user, generally the higher up in the network, the longer the tolerable latency and the more invariant the representation. At the lower levels on the user device 102, the modules 202, 203 can take advantage of lower latency and relatively high bandwidth is relatively high. This makes the lower layers suitable for real-time processing of media such as audio and video.

As seen in FIG. 3, the user device 102 and network server 110 have cooperatively shifted the boundary such that module 203 formerly executing on user device 102 has stopped, which stops communications between modules 202 and 203. Similarly, module 204 of the network server 110 cancels network communications with formerly running module 203 and starts module 203a, which now communicates in-device with module 204. Thereafter module 202 establishes communications with an equivalent module 203a via connection 113a. It will be understood that connection 113a parameters may be the same or different than connection 113, e.g., TCP/IP socket, network protocol, quality of service, etc.

Figure 4:
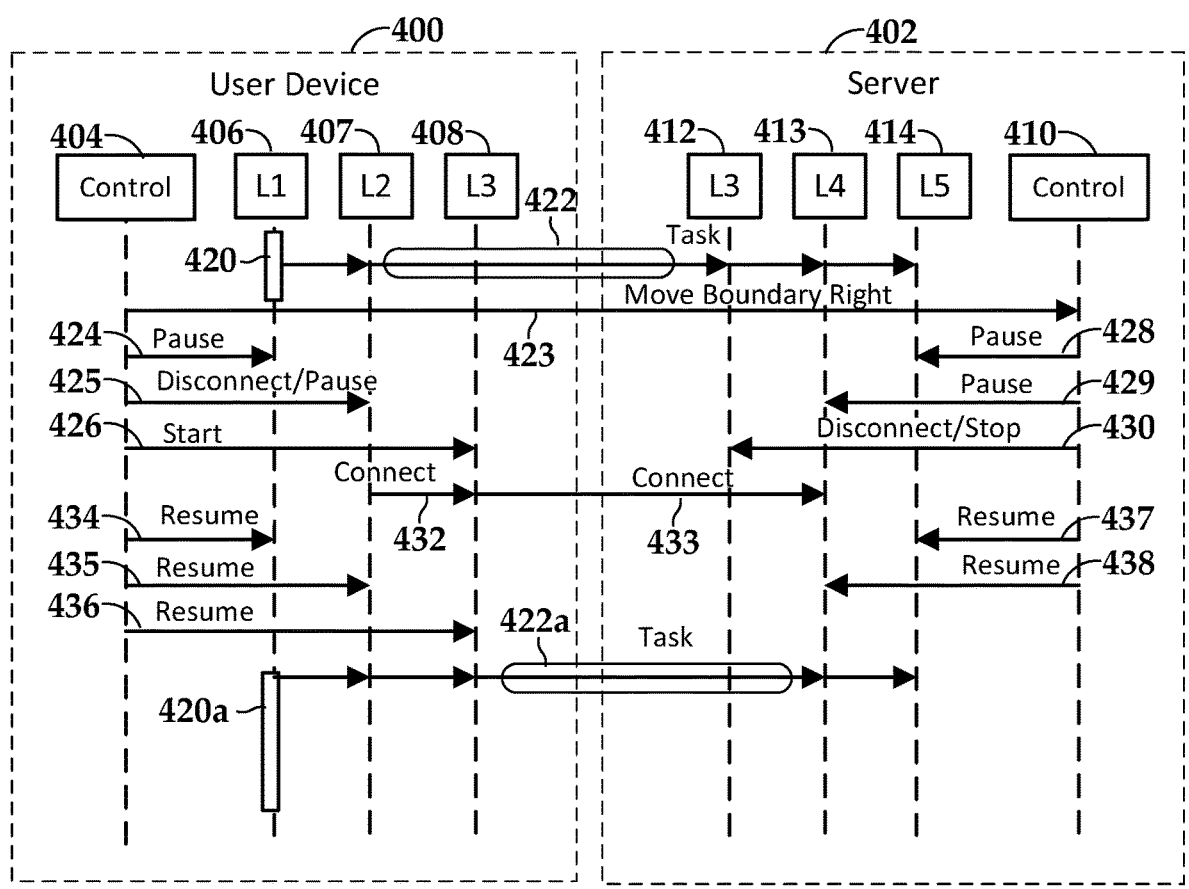
FIGS. 4, 5, and 5A are sequence diagrams illustrating modifying of a boundary between a user device and a network server that together form a deep learning network according to an example embodiment.

In FIG. 4, a sequence diagram illustrates another example of modifying a boundary between a user device 400 and a network server 402 that together form a deep learning network. The user device 400 includes a control unit 404 that coordinates aspects of the deep learning network with a corresponding control unit 410 of the network server 402. The control units 404, 410 may be separate processes that supervise layers 406-408, 412-414 of the deep learning network, or may be integral with the deep learning network processes. For example, the communication between processing layers 406-408, 412-414 may include control channels that allow the layers themselves to reconfigure the deep learning network without been overseen by a separate control process.

Three layers 406-408 of the deep learning network are shown as capable of operating on the user device 400, and three layers 412-414 are shown as capable operating on the server 402. Layers 408 and 412 are functionally equivalent, e.g., can be substituted for one another within the deep learning network. The layers 408, 412 may run on different operating systems, and may possible utilize different code bases, but can be swapped out to provide equivalent services at a particular level within the deep learning network. The user device 400 and network server 402 can include any number of functionally equivalent layers, and these equivalent layers may define the extent to which a boundary of the deep learning network can shift. Usually only one of the equivalent layers needs be running at a time (e.g., one on the user device 400 or server 402), however unused equivalent layers may be running but in an idle state, or used for other purposes (e.g., a parallel task with different boundary requirements).

Generally, each of the layers 406-408 and 412-414 may considered as a separate interface within each of the respective devices 400, 402. For example, each of layers 412-414 may be accessible remotely. This may be accomplished by a single process (e.g., control unit 410) running on the server 402 that allows querying available layers, selecting a particular layer with which to connect, and connecting to the layer. In another arrangement, each layer 412-414 may be independent processes utilizing different TCP ports that accept incoming internal or external network connection requests. In either case, a boundary of the deep learning network can be dynamically modified based on selection of one of multiple interfaces available between the user device 400 and the network server 402. This may be accompanied by an associated de-selection of another interface, e.g., a local interface of layers 406-408 within user device 400.

A currently processing task 420 utilizes layers 406, 407 on the user device 400 and layers 412-414 on the server 402. Layer 408 is not currently being used, as a current boundary 422 is between layer 407 of the user device 400 and layer 412 of the server 402. Based on a detected performance indicator/event (e.g., change in network conditions, local resource availability), the control unit 404 of the user device 400 sends a signal 423 to the control unit 410 of the server 402 to shift the boundary to the "right," which in the context of this diagram involves utilizing more computing resources on the user device 400 and fewer on the server 402. The signaling may also originate from the server 402, and additional data and signals (not shown) may be used to communicate parameters and options (e.g., how many layers to shift) and synchronize actions (e.g., initiate connections, resume processing tasks).

In response to the signal 423, the control unit 404 of the user device 400 pauses layer 406 (signal 424), disconnects and pauses layer 407 (signal 425), and starts layer 408 (signal 426). Similarly, control unit 410 of the server 402 pauses layers 413 and 414 (signals 428, 429), and disconnects and stops layer 412 (signal 430). The layer 412 and newly started layer 408 may have transfer state data (e.g., via control units 404, 410) as needed before layer 413 is stopped. Thereafter, connections 432 and 433 can be established between layers 407, 408, and 413 as shown. The processing is resumed via signals 434-438, after which the modified task 420a continues to operate using modified boundary 422a.

Figure 5:
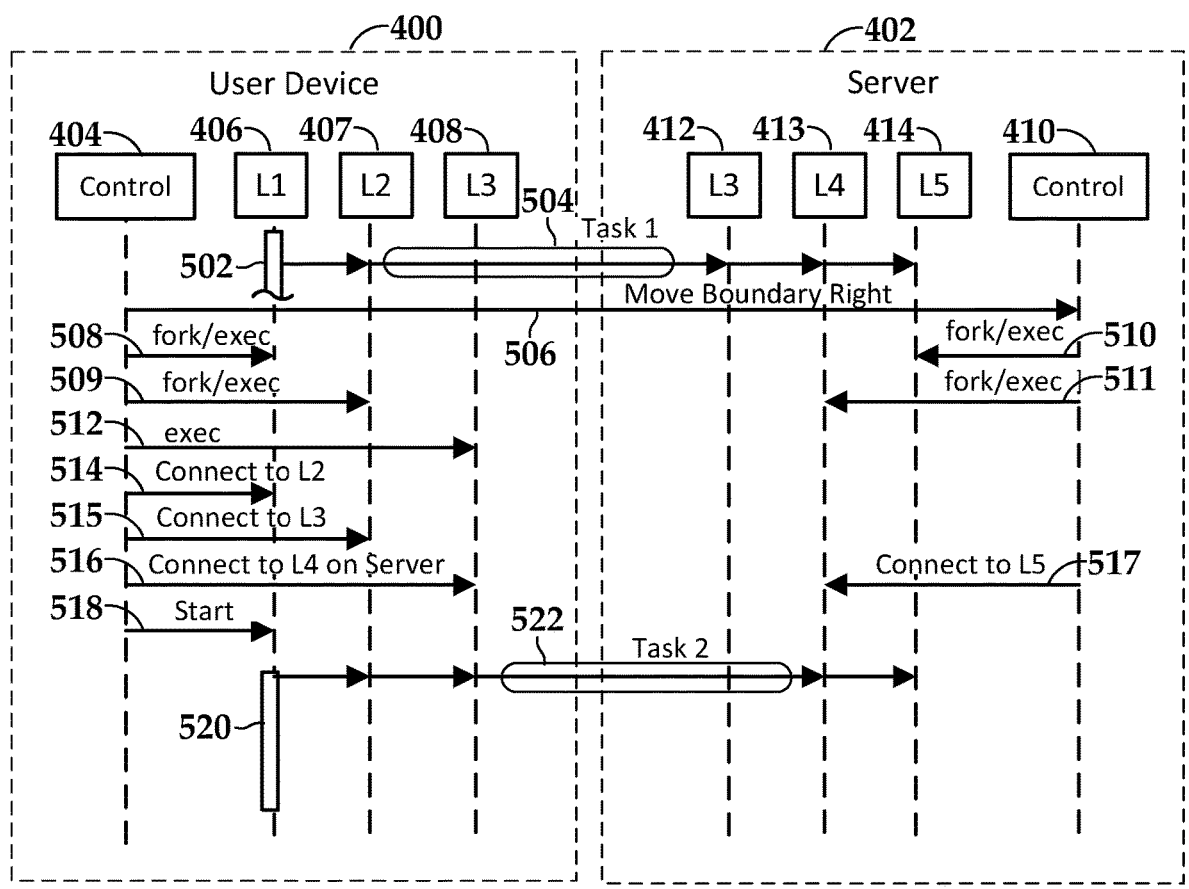

In the example of FIG. 4, the ongoing processing task is paused while the boundary of the deep learning network is modified. In FIG. 5, a sequence diagram illustrates how a parallel task can be initiated using a modified boundary. For purposes of brevity, the reference numbers in from FIG. 4 are used in FIG. 5 to indicate similar or equivalent components. Task 502 is executing and continues to execute during the remaining operations shown in FIG. 5 as appropriate under the circumstances (e.g., until input buffers are empty; completed processing of a unit, such as word or phrase). Signal 506 indicates a need to cooperatively move the boundary 504 for subsequent processing.

In this example, layers 406-408 and 412-414 are implemented as separately running processes on an operating system, and so can be duplicated using a command such as POSIX fork-exec or equivalents in other operating systems (e.g., 'spawn' used in Windows™ operating systems). The embodiment need not be limited to use of processes; other executable constructs (e.g., threads, objects) may be used instead of or in addition to use of separate processes. The control units 404, 410 spawn new copies of layers 406, 407, 413, 414 via signals/commands 508-511. Assuming a process for layer 408 is not running, it is started via signal/command 512.

After the appropriate processes are running, the control units 404, 410 cause the layers to connect to one another via signals 514-517. A signal 518 is then sent to cause a new task 520 to processing in parallel (or potentially so) with process 502. The new task 520 uses a different boundary 522 between the user device 400 and server 402. As before, the modified boundary involves layer 408 operating on the user device 408 in place of layer 412 on the server 402. It will be apparent that, for this and other embodiments, a shift in the other direction may be similarly implemented, as well as a shift over multiple, duplicate layers running on different devices.

Figure 5A:
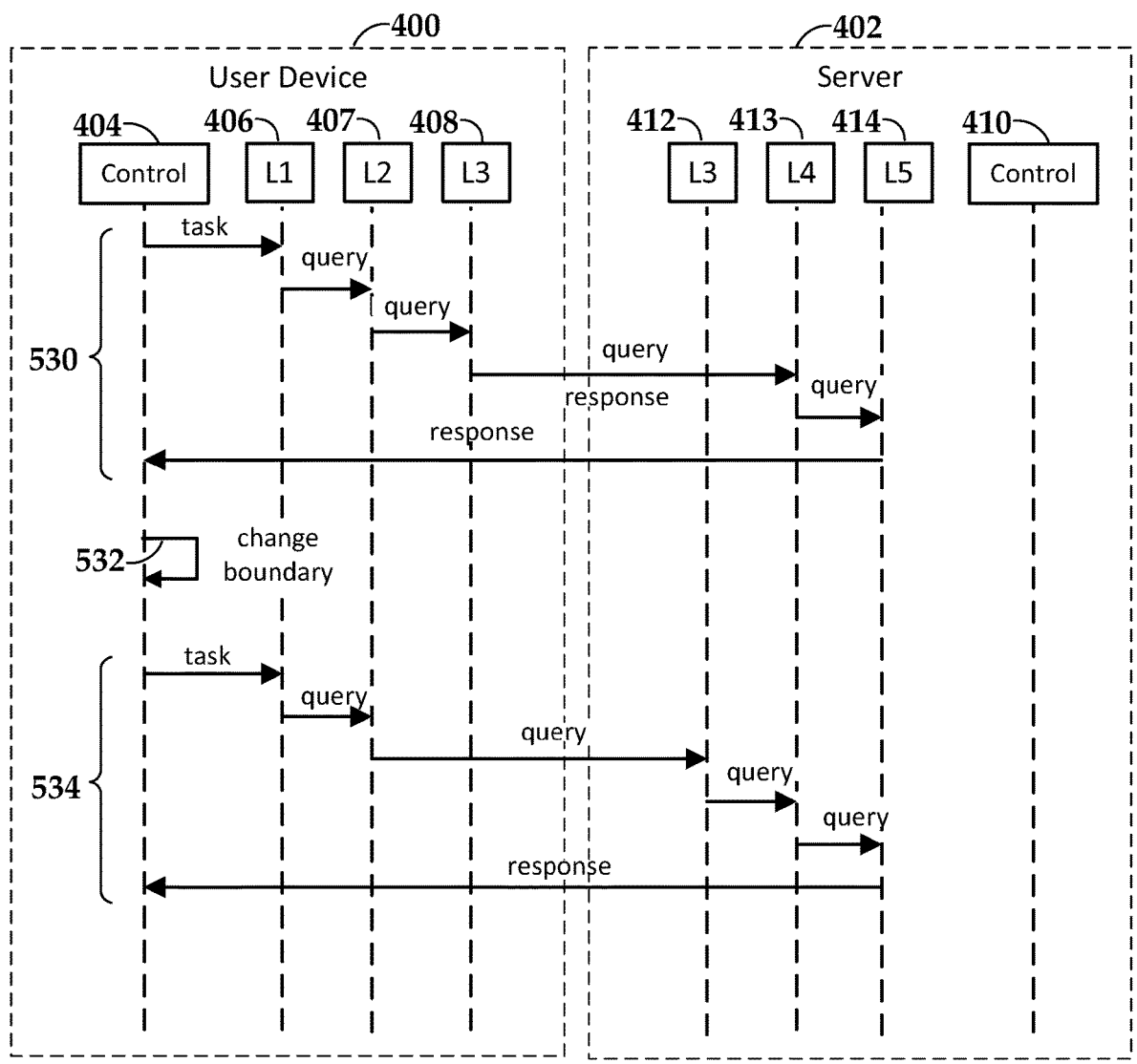

In the example of FIG. 4, the processing task was represented as a series of relatively-long-term, continuous connections, e.g., feeding streams of data through the connections. In other embodiments, the processing may be implemented as a series of brief inter-layer communications, e.g., a query-response paradigm. In FIG. 5A, a sequence diagram illustrates how inter-layer, query-response interactions may use a modified boundary. For purposes of brevity, the reference numbers in from FIG. 4 are used in FIG. 5A to indicate similar or equivalent components.

Operations 530 represent a task, where the boundary between the user device 400 and server 402 is between layers 408 and 413. In these operations 530, each layer receives some input from a lower layer, processes the input, and sends it along to the next higher layer. The output of the highest layer (layer 415 in this example) is of interest to the end user, and so the response is sent from the highest level 414 to the control unit 404. The control unit 404 can then process the result appropriately, e.g., directing the result to a program that initiated the operations 530. While not shown, there may be additional interlayer feedback responses, e.g., that allow adjusting performance parameters of the layer based on learning.

After the operations 530 complete, the user device 400 signals 532 to change the boundary, e.g. based on sensing network and/or device conditions. The signal 532 to change boundaries may be communicated to one or more the layers 406-408 via interprocess communications, setting of a configuration file, etc. For operations 534 of a subsequent task, this signal 532 only affects layer 407, which now sends its query to layer 412 instead of layer 408.

In this case, there is no need for the server control unit to be aware of the change 410, nor do levels 408 and 412 need to be aware of the change. This is because the boundary change can be made based on selection of one of multiple interfaces available between the user device and the network server. As such, levels 408, 412 may see a change in activity, but do not need to change the next higher level to which their own queries are directed. However, this may still involve cooperation between the user device 400 and the server 402, at least because the server 402 will be keeping all layers 412-414 available for connections and processing regardless of whether they are currently being used by the user device 400.

In previous examples, a deep learning network is distributed between two devices (a user device and a server), however this can be extended to more than one user device. In reference now to FIG. 6, a block diagram illustrates a system 600 according to another example embodiment. The system 600 includes user devices 602, 603 and server device 604. User devices 602, 603 are coupled via data connection 608 and user device 603 is coupled to server device 604 via data connection 610. The connection 610 to the server device 604 may be a network connection as previously described, e.g., a wide area network and/or internetwork. In one configuration, the user device 602 may include a wearable device and the connection 608 may include a proximity data network (e.g., Bluetooth). The other user device 603 may include a smartphone, table, laptop, etc. One or both of the user devices 602-603 may include sensors that provide encoded signals as input to a deep learning network as described below.

The devices 602-604 together form a deep learning network 612 having multiple layers 612a-d. The devices 602-604 are capable of operating overlapping portions of the deep learning network 612. Portions 614-616 of the deep learning network operate on the respective devices 602-604. Boundaries 618, 619 exist between respective portions 614-616 of the deep learning network 612. The boundaries 618, 619 may at least defined by the extent of the portions (e.g., layer 612a is within portion 614, layer 612b is within portion 615 and layers 612c-d are within portion 616) as well as communication links 608, 610 that are used to communicate across the boundaries 618, 619.

The boundaries 618, 619 can be modified based on cooperation between two or more of the devices 602-604. Changes in one of the boundaries 618, 612 will change the extent of at least two of the portions 614-616 of the deep learning network 612. For example, changing the boundary 619 will change the extents of portions 615 and 616, however portion 614 need not be changed. The modification of boundaries 618, 619 may occur for any reasons given above, such as network performance and cost, availability of power and computing resources, etc. The modification of boundaries 618, 619 may also involve changing network parameters (e.g., bandwidth used, transport layer used) and local processing (e.g., encoding size, size of buffers).

Figure 7:
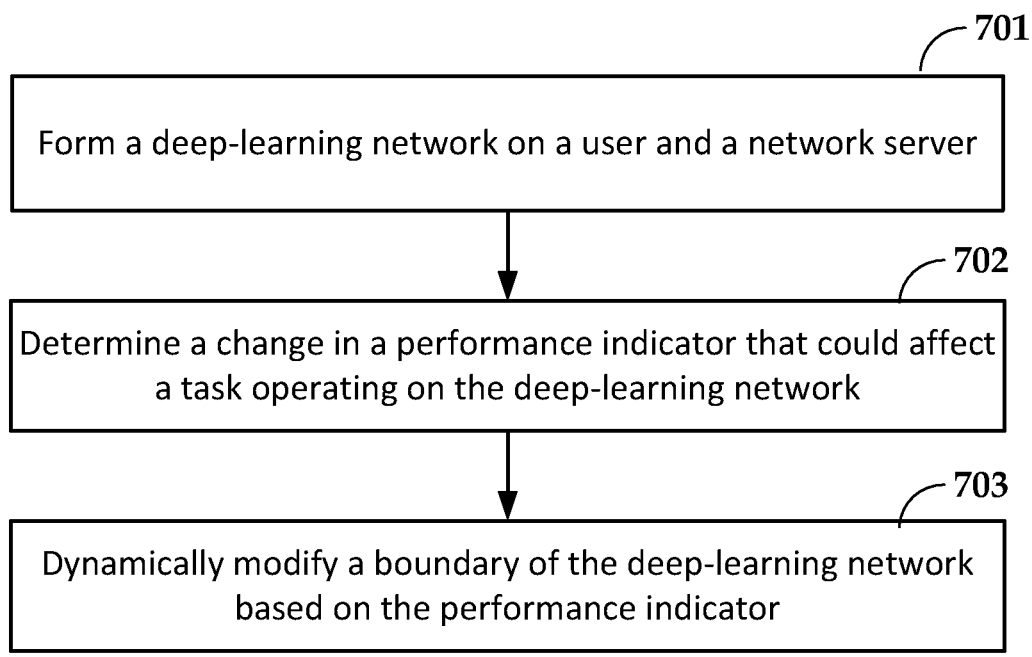
FIG. 7 is a flowchart illustrating a method according to an example embodiment.

In reference now to FIG. 7, a flowchart illustrates a method according to an example embodiment. The method involves forming 701 (e.g., via a connection between a user device and a network server) deep learning network for a processing task. A first portion of the deep learning network operates on a user device and a second portion of the deep learning network operates on a network server. A change in a performance indicator that could affect the processing task is determined 702.

The changing performance indicator may show that, e.g., a condition of the user device, the server, and/or a data transfer network that couples the two could affect performance of a past, present, or future task. The performance indicator need not be actively affecting a currently running task, but only potentially affecting the type of task being processed by the deep learning network. For example, if no current tasks are being processed (or no tasks have yet run since the device was started) and one of the above-noted conditions are detected, this may be sufficient to determine a change in the performance indicator. Based the change in the performance indicator, a boundary between the first portion and the second portion of the deep learning network is dynamically modified 703. This modification 703 is facilitated by cooperation between the user device and the network server.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A method comprising:
    establishing a connection between a user device and a network server;
    forming, via the connection, a deep learning network for a processing task that involves performing recognition on data that is streaming from the user device via a first process, a first portion of the deep learning network operating on the user device and a second portion of the deep learning network operating on the network server, the first and second portions each processing a different level of representation of the processing task;
    based on cooperation between the user device and the network server while the streaming of the data is ongoing and without pausing the processing task, dynamically modifying a boundary between the first portion and the second portion of the deep learning network based on a change of a performance indicator that could affect the processing task, the modification of the boundary changing the respective different levels of representation performed by the first and second portions of the deep learning network; and
    continuing the processing task via a second process that operates in parallel with the first processes, the second process utilizing the modified boundary to perform recognition on the data.

2. The method of claim 1, wherein the boundary is modified after the processing task is complete for the benefit of subsequent similar processing tasks.

3. The method of claim 1, wherein the boundary comprises an interface between hierarchical levels of the deep learning network.

4. The method of claim 1, wherein dynamically modifying the boundary comprises signaling between the user device and the network server to modify a current session.

5. The method of claim 1, wherein dynamically modifying the boundary comprises selecting different ones of multiple application program interfaces available between the user device and the network server.

6. The method of claim 1, wherein the processing task is performed on behalf of a user of the user device.

7. The method of claim 1, wherein the user device comprises a mobile device.

8. A network server, comprising:
    a network interface;
    a processor coupled to the network interface, the processor configured to:
        establish a connection with a user device;
        form, via the connection, a deep learning network for a processing task on behalf of the user device, the processing task performing recognition on data that is streaming from the user device via a first process, wherein a first portion of the deep learning network operates on the user device and a second portion of the deep learning network operates on the network server, the first and second portions each processing a different level of representation of the processing task;
        in cooperation with the user device, dynamically modify a boundary between the first portion and the second portion of the deep learning network while the streaming of the data is ongoing and without pausing the processing task, the modification of the boundary based on a change in a performance indicator that could affect the processing task, the modification of the boundary changing the respective different levels of representation performed by the first and second portions of the deep learning network; and
        continuing the processing task via a second process that operates in parallel with the first processes, the second process utilizing the modified boundary to perform recognition on the data.

9. The network server of claim 8, wherein the boundary comprises an interface between hierarchical levels of the deep learning network.

10. The network server of claim 8, wherein the boundary is dynamically modified based on signaling between the user device and the network server.

11. The network server of claim 8, wherein the boundary is dynamically modified based on selection of one of multiple interfaces available between the user device and the network server.

12. A user device, comprising:
a sensor;
a processor coupled to the sensor, the processor configured to:
encode signals from the sensor into a data stream;
send the data stream to a neural network for a processing task that involves a recognition of the data stream via a first process, wherein a first portion of the neural network operates on the user device and a second portion of the neural network operates on a network server in communication with the user device, the first and second portions each processing a different level of representation of the processing task;
in cooperation with the network server while the streaming of the data is ongoing and without pausing the processing task, dynamically modify a boundary between the first portion and the second portion of the neural network based on a change in a performance indicator that could affect the processing task, the modification of the boundary changing the respective different levels of representation performed by the first and second portions of the neural network and
continuing the processing task via a second process that operates in parallel with the first processes, the second process utilizing the modified boundary to perform recognition on the data.

13. The user device of claim 12, wherein the boundary comprises an interface between hierarchical levels of a deep-belief network.

14. The user device of claim 12, wherein the boundary is dynamically modified based on signaling between the user device and the network server.

15. The user device of claim 12, wherein the boundary is dynamically modified based on selection of one of multiple interfaces available between the user device and the network server.

16. The user device of claim 12, wherein the user device comprises a mobile device.

17. The method of claim 1, wherein the processing task involves at least one of speech recognition and image recognition.

18. The method of claim 1, further comprising changing a resolution of the data streaming from the user device based on the change of the performance indicator.

* * * * *